Feb. 15, 1938.  W. W. CRILEY  2,108,165

COMBINATION SAFETY SLIP AND DRIVE MECHANISM

Filed Aug. 15, 1935

INVENTOR
William W. Criley,
BY Justin W. Macklin,
ATTORNEY

Patented Feb. 15, 1938

2,108,165

UNITED STATES PATENT OFFICE 2,108,165

COMBINATION SAFETY SLIP AND DRIVE MECHANISM

William W. Criley, Cleveland, Ohio

Application August 15, 1935, Serial No. 36,317

9 Claims. (Cl. 192—55)

This invention relates to driving clutches for large machines such as presses, forging machines and like heavy duty machinery and particularly of the type operating intermittently. Such machines as is well known, are subject to sudden stalling or occasional locking due to overloading or greater than usual resistance of the materials being worked upon.

In such machinery large flywheels are customarily used adding the momentum to the power delivering the required impulse or pressure to the work, and slippage between the flywheel and driving means is desirable.

It is an object of this invention to control the torque capacity to obtain the full normal driving torque and yet avoid endangering the machine.

Heretofore slippage has been provided not only by means of a friction clutch but additional slippage in the driving connection between the flywheel and the driven or working parts of the machine.

The clutches of such machines are usually of the friction type and applied by fluid pressure such as through controlled air pressure. Such pressure however, is often subject to wide fluctuations due to variation in the line pressure and thus an oversized clutch is desirable to assure operation at full torque capacity. This requires the use of some secondary safety or slip connection in order that should too high pressure on the oversized clutch be in effect, in the event of an overload, the slippage resulting in the safety slip connection will prevent any damage to the parts of the machine.

The use of such slippage however has heretofore relied upon previously set friction members tightened as by bolts or the like to an indefinite pressure, which varies with the size of the wrench and strength of the workman.

Friction clutches under the control of the regulated fluid pressure are desirable to be used, and I find that I may compensate for the low pressures or maintain safety with the high pressure, or greatest effective torque of a given clutch, by providing the secondary slippage of predetermined torque.

It is therefore an object of this invention to provide a secondary slippage safety friction connection of predetermined and constant torque.

Another object is to provide such a friction connection which shall in no way add to the inertia of the intermittently rotating parts.

Thus a more specific object is to provide a friction connection between a driving member or flywheel and driving clutch, and further which shall be capable of having its torque accurately predetermined during the assembly of the machine, and which shall not be subject to variation over a period of time and not variable with wear.

Still another object is to provide a convenient and effective means for locking the driving member and clutch for backing off after stalling or jamming the machine, and the use of which shall not disturb the setting of the friction connection.

A further specific object is to combine a clutch, flywheel and secondary slip friction clutch connection in a composite assembly characterized in effectiveness of operation, convenience of assembly and cheapness of manufacture.

In carrying out my invention I may use, in a general way, a clutch and flywheel assembly such as shown in my prior patent, Number, 1,968,130, granted July 31, 1934.

The present invention constitutes a simplified form of such an arrangement, combined with means for attaining the above objects.

Figure 1:
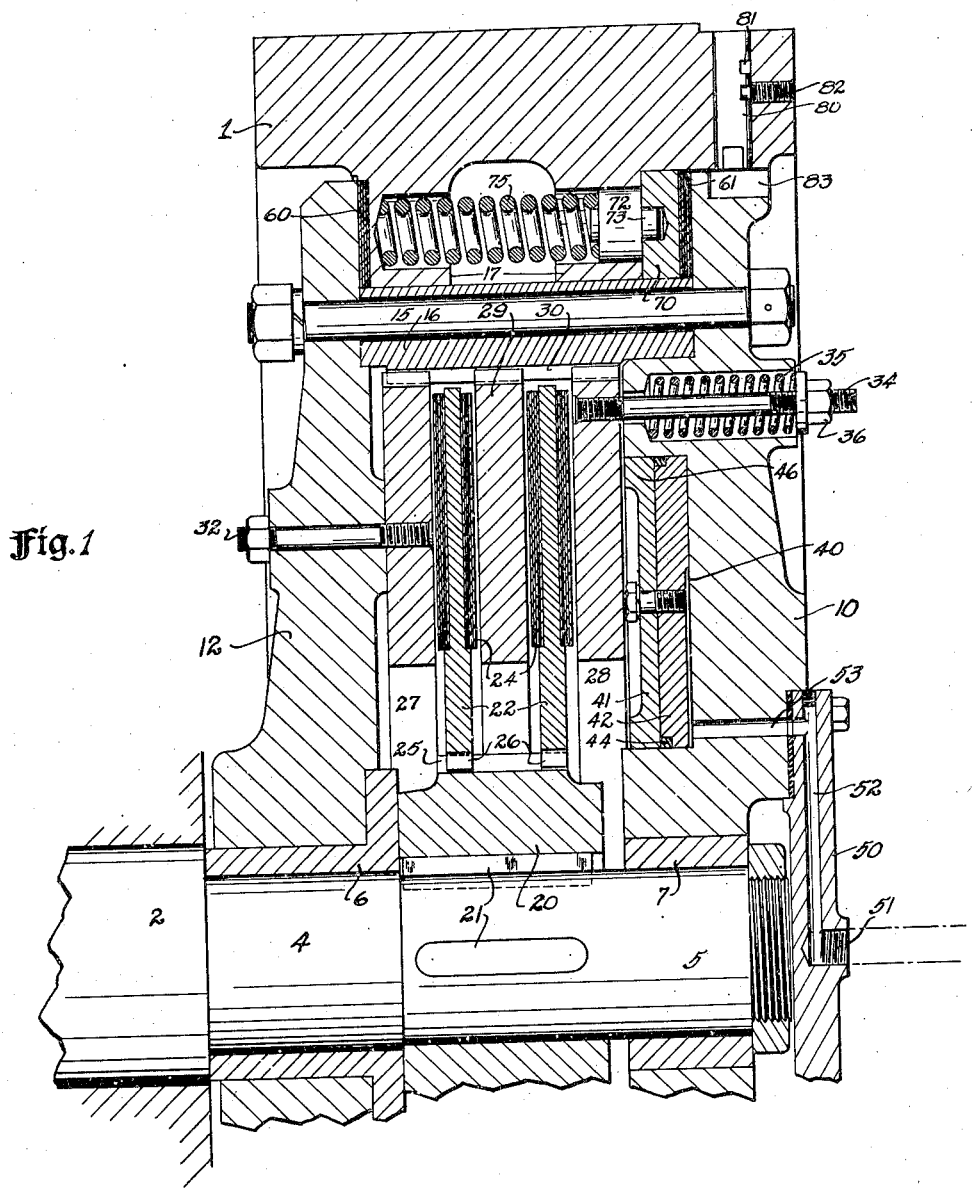
Fig. 1 is a central longitudinal radial section through the upper half of a clutch flywheel and friction slip assembly mounted on a drive shaft. It is understood that the lower half of the view is omitted but the parts are symmetrical with those shown.

Describing the present illustrative embodiment by the use of reference characters my combined clutch and friction drive mechanism comprises essentially a flywheel, or inertia member 1, a driven shaft or back shaft or pinion shaft 2, and the predetermined friction means and air clutch members as shown.

The shaft is shown as having reduced portions 4 and 5 on which are bearing members 6 and 7 respectively. On the bearing 7 is a wheel element shown as in the nature of a disk 10 fitted at its periphery inside of the flywheel and serving to center the same, and also carrying the clutch actuating members as will be presently described. A corresponding disk or wheel element 12 is mounted on the member 6. These two members are shown as connected by bolts 15 extending through the clutch ring 16 spacing the outer portions of the members 10 and 12 and which may also form a bearing or support for inwardly projecting flanges 17 of the flywheel member.

The clutch mechanism is similar to the construction of that of my prior patent above mentioned. As shown a collar 20 is secured by keys 21 to the reduced portion 5 of the back shaft 2, of the forging machine or the like. It is provided with clutch plate members 22 having friction discs rigid thereon as indicated at 24. These plates 22 connect with the member 20 by teeth 25 on the member 20 and teeth 26 on the annular discs or plates 22, slidably fitted thereto.

Flywheel driven annular plate members adapted to co-act with the friction surfaces 24 are shown at 27, 28, and 29. These in turn have teeth slidably engaging with internal teeth 30 on the ring 16. The annular plate 27 may be connected by bolts with the member 12 as shown at 32. A series of bolts as indicated at 34 connecting with the disc 28 may urge it outwardly, that is, to the right, each by a spring 35 bearing against a suitable adjacent nut and collar indicated at 36, for opening or freeing the clutch.

To move the discs 24 on their plates 22 and the co-acting discs 27, 28, and 29 together I have shown an annular fluid actuated piston operating correspondingly to the construction of the above mentioned patent. For convenience however, it is here again briefly described.

In an annular recess 40 in the member 10, which has concentric cylindrical walls, I have provided an annular piston shown as comprising two plates 41 and 42 between which is fitted a suitable packing ring 44. The inner plate of the piston is provided with off-set or flanged portions the outer of which indicated at 46 may engage the plate 28 for moving it inwardly and causing the frictional engagement of the clutch parts, as described, thus connecting the teeth 30 and 25 and members 16 and 20 and effecting the driving of the shaft 2.

The actuation of the piston may be effected by any suitable fluid pressure means. As shown at the center or hub of the member 10, is a cover plate 50 having a central threaded opening 51 to which may lead an air line through a suitable rotating coupling, not shown. A radial passage 52 connects with the piston cylinder space through the passage 53. It is understood of course, that the pressure medium is preferably compressed air under suitable control for governing its actuation, though any pressure means may be used.

The flywheel is a type driven by a belt, thus constituting a driving flywheel member and the secondary friction or predetermined safety torque control as shown is effected by friction, disc rings 60, 61, which may be made rigid with the disks 12 and 13 respectively or flanges 17 in any practical manner. Between the flywheel and the member 16 I have shown a disc ring 70 bearing against the friction ring 61 under the influence of dowel plungers 72, shown as each having a boss 73 fitted into a recess in the ring 70. Springs 75 of predetermined size and strength press the plunger blocks 72 with approximately definite predetermined force against the ring 70 and correspondingly react against both of the friction disc rings 60 and 61.

It will thus be seen that the flywheel member 1 and the members 10 and 12 are normally rigidly though frictionally connected subject to relative rotation upon force or inertia action sufficient to overcome the friction at the discs 60 and 61. In normal operation, the drive through the flywheel members 10 and 12 to the clutch member and thus to the shaft 2 is without slippage except in the clutch. However, upon overloading it will be seen that relative slippage occurs between the flywheel 1 and the members 10 and 12 and driving ring member 16, of course permitting the flywheel to overrun upon the stalling or jamming of the machine and correspondingly without endangering the parts of the machine.

In the form shown the overrunning of the flywheel occurs by reason of overcoming friction upon the friction discs or rings 60 and 61 as stated and which by reason of the tension of the bias compression of the springs 75, causes a constant and fixed frictional value to be maintained between the driving flywheel member and the members 10 and 12 and the clutch members connected with the latter.

Figure 2:
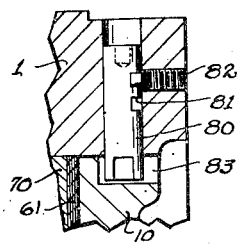
Fig. 2 is a detail of the means for locking the flywheel element to the clutch driving element showing the same in the locking position.

Upon the machine becoming jammed the friction at the disc 60 and disc 61 may be insufficient to effect reverse drive of the shaft 2. I therefore desire to provide a means for locking the clutch to the flywheel member 1, temporarily only, to effect such backing off operation. To this end I provide a bolt or key member 80 provided with notches as at 81, into which the end of a screw 82 may fit for holding the locking bolt in either of two positions, the inner or locking position of which is shown in Fig. 2 where its one end engages a recess 83 in the member 10. Thus the full power of the clutch and full momentum of the rim 1 may be effectively used for driving when key 80 is in this locking condition.

With the key in the locking position instead of applying the driving power to the flywheel, obviously pry-bars or jacks may be applied to the flywheel to reverse or back off where the nature of the jam requires that this reversal should be slowly and carefully made.

In ordinary running conditions this locking bolt 80 is in its outer position as in Fig. 1, free from the notch 83 permitting the slippage or overrunning referred to.

As heretofore indicated, the construction and design of the arrangement of this present invention is predicated upon the assumption that the use of an oversized clutch increases the efficiency of the machine, and that fluctuation in the air pressure will not effect failure of drive or failure to develop the full required power at periods of low pressure. The oversized clutch will effectively overcome the initial inertia of the parts of the machine, but this abundance of driving power is not permitted to result in application of a destructive power or pressure to the driven parts, by reason of the slip friction of predetermined effective torque, as described.

It will be seen that the dowel plugs or plungers 72 may be selected for length at the time of assembly of the machine, or may be varied later by changing them to meet given working conditions. Thus inaccuracies due to variation of the strength applied to the tightening of the nuts of the bolts 15 is eliminated inasmuch as these bolts are simply tightened firmly upon the clutch ring 16 and the predetermined friction driving torque results from the selection of the springs 75 and dowel plugs 72.

It will be seen however, that the springs and dowel plugs may be omitted for some installations and that the frictional pressure may be applied to the friction rings 60 and 61 by tightening on the bolts. In such a case it is only necessary to shorten the ring 16 to provide slight clearance so that the tension of the bolts is effective upon the friction rings 60 and 61.

The composite assembly provides for the use of a compact arrangement of driving flywheel and oversized clutch for quickly overcoming the inertia of the parts for compensating for low pressures in the fluid pressure line, and yet the danger to the machine may be eliminated by the predetermined friction between the clutch and the flywheel.

It will be further seen that a convenient means of locking the clutch and flywheel, for backing off, has been provided, and that other objects of simplicity, effectiveness of operation, and so forth, are accomplished by this invention.

Having thus described my invention, what I claim is:

1. A combination of a workshaft, wheel carrying elements mounted thereon and spaced apart, a heavy flywheel member carried by said elements, a friction clutch between said elements and within said flywheel member, with a safety friction means between said elements and the flywheel, and springs of predetermined modulus exerting pressure against said safety friction means.

2. A combination of a workshaft, wheel carrying elements mounted thereon, a heavy flywheel rim member carried by said elements, a fluid operated friction clutch between said elements and within the flywheel, with a safety slip device comprising friction discs between said elements and the flywheel, and springs of predetermined modulus exerting a uniform pressure against said discs.

3. A workshaft and a driving flywheel rim, a pair of wheel members between the shaft and flywheel rim, a fluid actuated disc clutch between said members and within the flywheel rim, and a pair of friction rings between said members and the flywheel rim and means normally exerting constant pressure on said friction means.

4. A driving shaft, a pair of wheel members rotatably mounted thereon, a flywheel rim member carried by the wheel members, a connecting member between said wheel members, clutch means including friction disc members between the wheel members, a fluid actuated means for actuating said clutch means for frictionally connecting the wheel members and shaft, friction rings radially outside of said connecting member and between the wheel members and flywheel rim member and adapted to permit slippage under predetermined torque conditions.

5. A work shaft and a driving fly wheel rim, a pair of wheel members between the shaft and fly wheel rim, a disk clutch between said members and within the fly wheel rim, said clutch capable of operating under varying pressures, friction rings between said members and flywheel rim, and means normally exerting constant pressure on said friction rings to limit the torque on the work shaft to a constant maximum magnitude.

6. A shaft, a pair of wheel members rotatably mounted thereon, a flywheel rim member carried by the wheel members, there being opposed radial surfaces on said flywheel rim member and said wheel members, and friction ring disks engaged by said radial surfaces, a clutch member fixed on the shaft, a complementary clutch member between and fixed to the wheel members, actuating means for actuating said clutch members, whereby the clutch members may be operated under varying pressures and slippage is permitted at the said radial surfaces under predetermined torque conditions.

7. In a power transmitting apparatus, a work shaft, a flywheel rim member, a carrying member comprising a pair of wheel elements mounted on the shaft and carrying the flywheel rim member, a friction disk clutch between said wheel elements for selectively drivingly connecting the carrying member to the shaft, said clutch being operable under varying disk engaging pressures, thereby varying the frictional resistance between the carrying member and the shaft, a torque overload safety means having friction surfaces interposed between and engaging both the flywheel rim member and the carrying member, and uniform yieldable pressure means mounted on one of the said members and exerting a constant uniform pressure on the other of said members through said friction surfaces to constrain the torque delivered by said power transmitting apparatus below a predetermined magnitude.

8. In a power transmitting apparatus, an intermittently rotatable shaft, radially extending rim supporting means mounted on the shaft for rotation relative thereto about the axis thereof, a flywheel rim member supported and guided by the outer periphery of the rim supporting means for rotation about the axis of the shaft and relative to the rim supporting means, clutch means operatively interposed between the rim supporting means and the shaft for selectively, drivingly connecting and disconnecting the shaft and rim supporting means, a friction safety slip means for limiting torque transmission between the shaft and rim member including friction surfaces on the rim member and said rim supporting means, respectively, and resilient uniform pressure means for effecting uniform pressure engagement on said friction surfaces with each other for normally frictionally connecting the rim supporting means and flywheel rim member for rotation together about the axis of the shaft.

9. In a power transmitting apparatus, a flywheel rim member, an intermittently rotatable shaft, radially extending flywheel rim member supporting means mounted on the shaft for rotation relative thereto about the axis thereof, said flywheel rim member supporting means having a peripheral wall portion supporting the flywheel rim member for rotation about the axis of the shaft and relative to the flywheel rim member supporting means, said rim supporting means and rim member having axially spaced radial friction surfaces at the margins of said peripheral wall portion and frictionally engaging each other and constraining the rim member and rim support from axial displacement, clutch means operatively interposed between the rim supporting means and the shaft for selectively, drivingly connecting and disconnecting the shaft and rim supporting means, and resilient uniform pressure means for effecting uniform pressure engagement of said friction surfaces of the rim member and rim supporting means with each other for normally frictionally connecting the rim supporting means and rim member for rotation together about the shaft axis.

WILLIAM W. CRILEY.